United States Patent
Summers et al.

(10) Patent No.: US 10,982,707 B2
(45) Date of Patent: Apr. 20, 2021

(54) TIE BOLT RETENTION

(71) Applicant: Goodrich Corporation, Charlotte, NC (US)

(72) Inventors: Herbert S. Summers, Trotwood, OH (US); Alan Michael Bonifas, Vandalia, OH (US)

(73) Assignee: Goodrich Corporation, Charlotte, NC (US)

( * ) Notice: Subject to any disclaimer, the term of this patent is extended or adjusted under 35 U.S.C. 154(b) by 239 days.

(21) Appl. No.: 16/352,527

(22) Filed: Mar. 13, 2019

(65) Prior Publication Data

US 2020/0063784 A1 Feb. 27, 2020

Related U.S. Application Data

(60) Provisional application No. 62/720,445, filed on Aug. 21, 2018.

(51) Int. Cl.
| | |
|---|---|
| *F16B 39/04* | (2006.01) |
| *F16B 39/20* | (2006.01) |
| *F16B 39/10* | (2006.01) |
| *F16B 41/00* | (2006.01) |

(52) U.S. Cl.
CPC .............. *F16B 39/20* (2013.01); *F16B 39/10* (2013.01); *F16B 41/002* (2013.01)

(58) Field of Classification Search
CPC ......... F16B 39/10; F16B 39/20; F16B 41/002
USPC ..................... 411/87, 88, 90, 93, 95, 96, 999
See application file for complete search history.

(56) References Cited

U.S. PATENT DOCUMENTS

| | | | | |
|---|---|---|---|---|
| 595,193 | A | * 12/1897 | McMurty | F02D 41/009 123/613 |
| 1,379,607 | A | * 5/1921 | Ashley | F16B 39/20 411/87 |
| 1,598,495 | A | * 8/1926 | Nelson | F16B 39/10 411/120 |
| 2,707,508 | A | 5/1955 | Durst | |
| 2,758,628 | A | 8/1956 | Rice | |
| 3,648,749 | A | * 3/1972 | Warren | F16B 39/10 411/87 |
| 4,657,457 | A | * 4/1987 | Rickwood | F16B 39/101 411/93 |
| 4,976,576 | A | * 12/1990 | Mahaney, Jr. | F16B 39/10 411/121 |
| 6,478,521 | B1 | 11/2002 | Tschunko et al. | |

(Continued)

FOREIGN PATENT DOCUMENTS

| | | |
|---|---|---|
| EP | 865940 | 9/1998 |
| EP | 3324059 | 5/2018 |

(Continued)

OTHER PUBLICATIONS

European Patent Office, European Search Report dated Jan. 17, 2020 in Application No. 19191709.5.

*Primary Examiner* — Gary W Estremsky

(74) *Attorney, Agent, or Firm* — Snell & Wilmer L.L.P.

(57) ABSTRACT

A tie bolt retention assembly includes a retention ring configured to contact a tie bolt head of a tie bolt; a retention washer configured to be disposed between the tie bolt head and a wheel section of a wheel assembly; and a retainer configured to engage with the retention washer; wherein the retention washer and the retainer are configured to secure the retention ring to the tie bolt head.

15 Claims, 7 Drawing Sheets

(56) References Cited

U.S. PATENT DOCUMENTS

| | | | | |
|---|---|---|---|---|
| 8,632,287 | B2* | 1/2014 | Walton | F16B 41/002 |
| | | | | 411/107 |
| 8,794,028 | B2* | 8/2014 | Petersen | F25B 39/028 |
| | | | | 62/525 |
| 9,925,827 | B2 | 3/2018 | Herrmann | |
| 9,956,817 | B2 | 5/2018 | Miller | |
| 2010/0008743 | A1* | 1/2010 | Bawden | F16B 39/10 |
| | | | | 411/130 |

FOREIGN PATENT DOCUMENTS

| | | |
|---|---|---|
| WO | 9614515 | 5/1996 |
| WO | 02101249 | 12/2002 |
| WO | 2018145783 | 8/2018 |

\* cited by examiner

TIE BOLT RETENTION

CROSS-REFERENCE TO RELATED APPLICATIONS

This application claims priority to, and the benefit of, U.S. Provisional Patent Application Ser. No. 62/720,445, entitled "WASHER-BOLT HOLDER" as filed on Aug. 21, 2018 and hereby incorporated by reference in its entirety for all purposes.

FIELD

The present disclosure relates to bolt retention systems, such as, for example, tie bolt retention systems and methods for a wheel assembly of an aircraft.

BACKGROUND

Certain aircraft, for example, use multi-split wheel assemblies, such as using two or more wheel sections secured together to form a basis for a tire/wheel. The wheel sections may be secured to one other using tie bolt assemblies, such as using a tie bolt having a bolt head at one end and a grip nut at an opposing end that engages with treads on an outer shaft surface of the tie bolt.

SUMMARY

In various embodiments, a tie bolt retention assembly includes at least the following: a retention ring configured to contact a tie bolt head of a tie bolt; a retention washer configured to be disposed between the tie bolt head and a wheel section of a wheel assembly; and a retainer configured to engage with the retention washer; wherein the retention washer and the retainer are configured to secure the retention ring to the tie bolt head.

In various embodiments: retainer comprises a retention spring; and/or an extension arm of the retention washer is configured to engage a hook of the retention spring; and/or a bridging piece of the retention spring includes a coil; and/or the retention spring is configured to snap into place over the tie bolt head when aligned with the retention washer; and/or the retention ring includes an anti-rotation protuberance; and/or the anti-rotation protuberance is configured to engage a cavity within the tie bolt head; and/or the retainer comprises a safety cable; and/or an extension arm of the retention washer is configured to engage the safety cable; and/or the tie bolt retention assembly is configured for use with an aircraft wheel assembly.

In various embodiments, a wheel assembly includes at least the following: a tie bolt securing a first wheel section to a second wheel section, the tie bolt having a tie bolt head proximal the first wheel section; a retention ring configured to contact the tie bolt head; a retention washer configured to be disposed between the tie bolt head and the first wheel section; and a retainer configured to engage with the retention washer; wherein the retention washer and retainer are configured to secure the retention ring to the tie bolt head.

In various embodiments: the retainer comprises a retention spring; and/or the retainer comprises a safety cable; and/or the retention ring includes an anti-rotation protuberance; and/or the tie bolt head includes a cavity and the anti-rotation protuberance is configured to engage the cavity; and/or the wheel assembly is configured for use with an aircraft wheel assembly.

In various embodiments, a method of securing a retention ring to a wheel assembly includes at least the following: affixing a retention washer to the wheel assembly; installing the retention ring in contact with a tie bolt head of a tie bolt of the wheel assembly; and applying a spring force to the retention washer or attaching a safety cable to the retention washer to secure the retention ring to the tie bolt head.

In various embodiments: the wheel assembly is configured for use with an aircraft wheel assembly; and/or the method further includes reducing the retention ring from rotating relative to a wheel section of the wheel assembly; and/or the method further includes engaging an anti-rotation protuberance of the retention ring with a cavity within the tie bolt head.

BRIEF DESCRIPTION OF THE DRAWINGS

The accompanying drawings illustrate various embodiments employing the principles described herein and are a part of the specification. The illustrated embodiments are meant for description only, and they do not limit the scope of the claims, and in which:

DETAILED DESCRIPTION

This detailed description of exemplary embodiments references the accompanying drawings, which show exemplary embodiments by way of illustration. While these exemplary embodiments are described in sufficient detail to enable those skilled in the art to practice this disclosure, it should be understood that other embodiments may be realized and that logical changes and adaptations in design and construction may be made in accordance with this disclosure and the teachings herein described without departing from the scope and spirit hereof. Thus, this detailed description is presented for purposes of illustration only and not of limitation.

The present disclosure describes various embodiments of bolt retention systems, such as configured, and/or suitable, for example, for securing wheel sections of a wheel assembly in mating alignment with one another. In various embodiments, for example, the various embodiments are used to secure tie bolts in a wheel assembly of an aircraft.

Such tie bolt systems and methods may prevent and/or impair tie bolts from becoming loose and/or dislodging from wheel sections of wheel assemblies, thereby reducing chances that a dislodged tie bolt may cause damage to a wheel section, a wheel assembly, a brake system, and/or other component, such as related, for example, to an aircraft.

Figure 1:
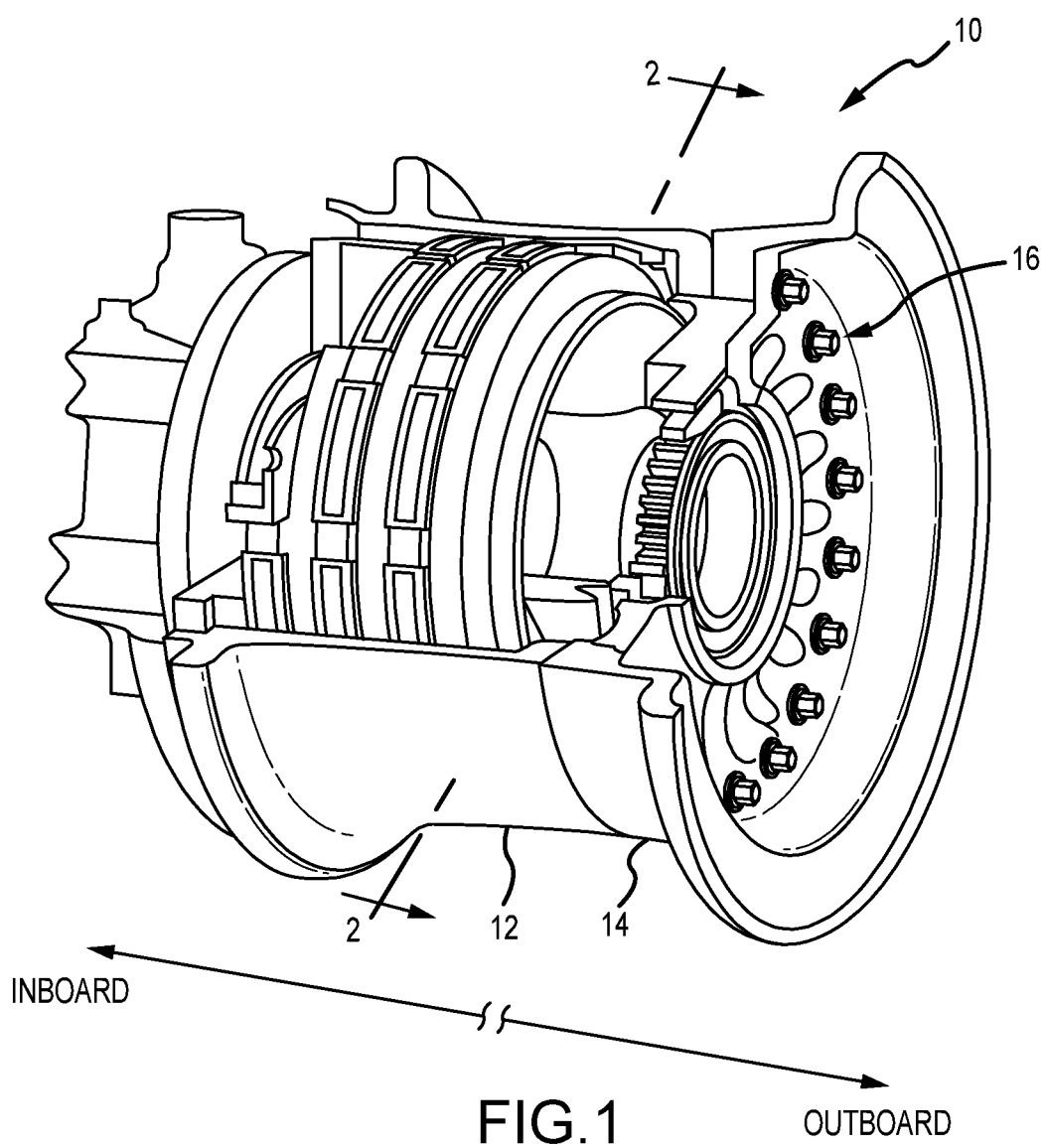
FIG. 1 is a perspective view of a wheel assembly, such as an aircraft wheel assembly, in accordance with various embodiments.

Referring now to FIG. 1, a wheel assembly 10 is illustrated in accordance with various embodiments. In various embodiments, the wheel assembly 10 comprises a split wheel assembly. In various embodiments, for example, the wheel assembly 10 comprises a first wheel section 12 coupled to a second wheel section 14. In various embodiments, the first wheel section 12 is inboard in reference to the wheel assembly 10 and/or the second wheel section 14, and the second wheel section 14 is outboard in reference to the wheel assembly 10 and/or the first wheel section 12. In various embodiments, the first wheel section 12 (i.e., the inboard wheel section) and the second wheel section 14 (i.e., the outboard wheel section) are coupled together using one or more tie bolt(s) 16 (references herein are to the singular and/or plural and inclusive of both), the tie bolts 16 extending from the first wheel section 12 to and towards the second wheel section 14 in an inboard-to-outboard orientation.

Figure 2:
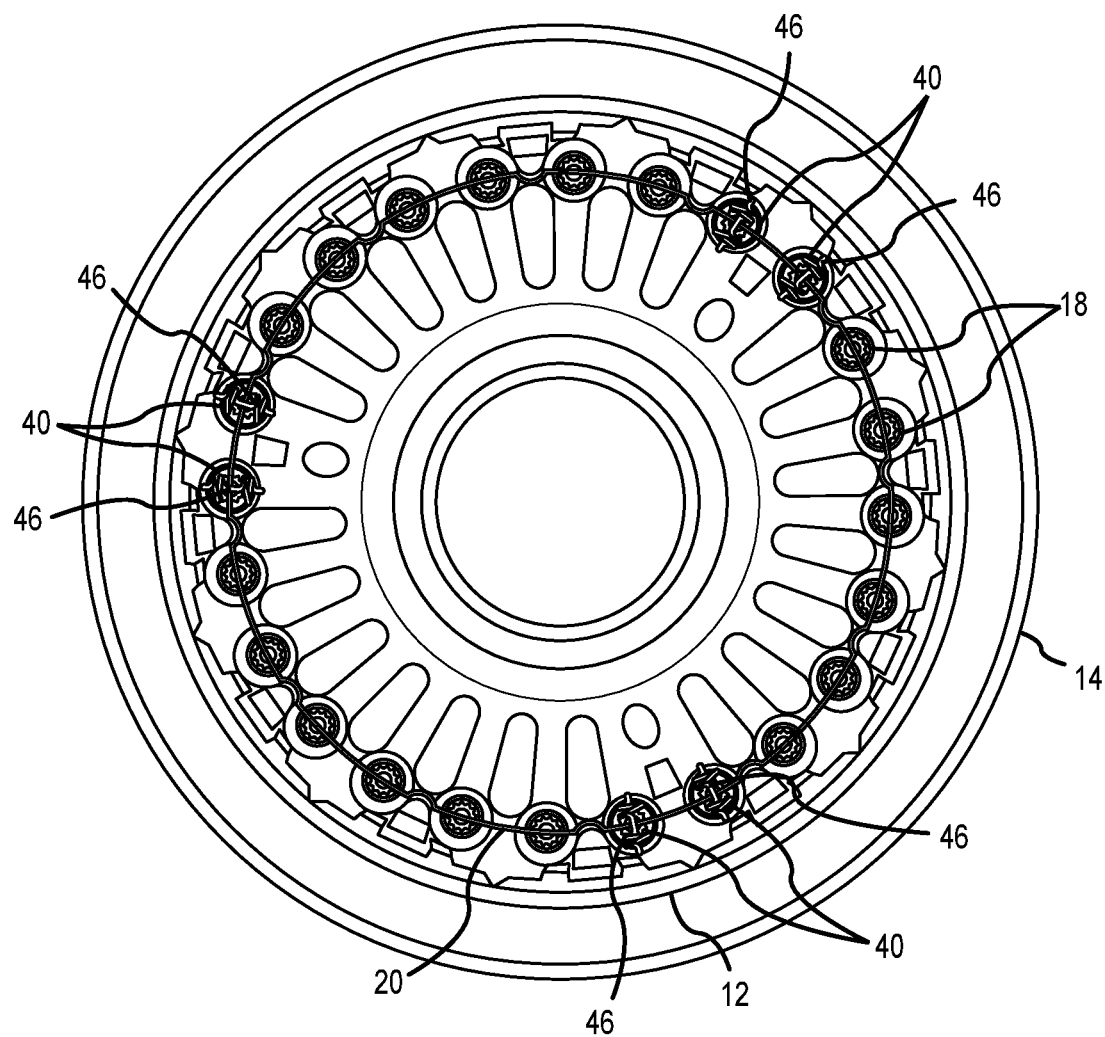
FIG. 2 is an outboard-looking view from the inboard wheel section of FIG. 1, taken along line 2-2 of FIG. 1, in accordance with various embodiments.

Referring now also to FIG. 2, an outboard-looking view of a portion of the first wheel section 12 of the wheel assembly 10 of FIG. 1 is provided, in accordance with various embodiments. The outboard-looking view of the first wheel section 12 in FIG. 2 is taken along line 2-2 of FIG. 1, looking outboard/outward from the wheel assembly 10 and/or from the first wheel section 12 of FIG. 1.

Referring generally, FIG. 2 also shows various tie bolt heads 18 (references herein are to the singular and/or plural and inclusive of both) of the various tie bolts 16 of FIG. 1, extending from and/or through the first wheel section 12 to the second wheel section 14. In various embodiments, the tie bolt heads 18 are secured to the first wheel section 12 by a retention ring 20 positioned circumferentially about the tie bolt heads 18, as elaborated upon further herein.

Figure 3:
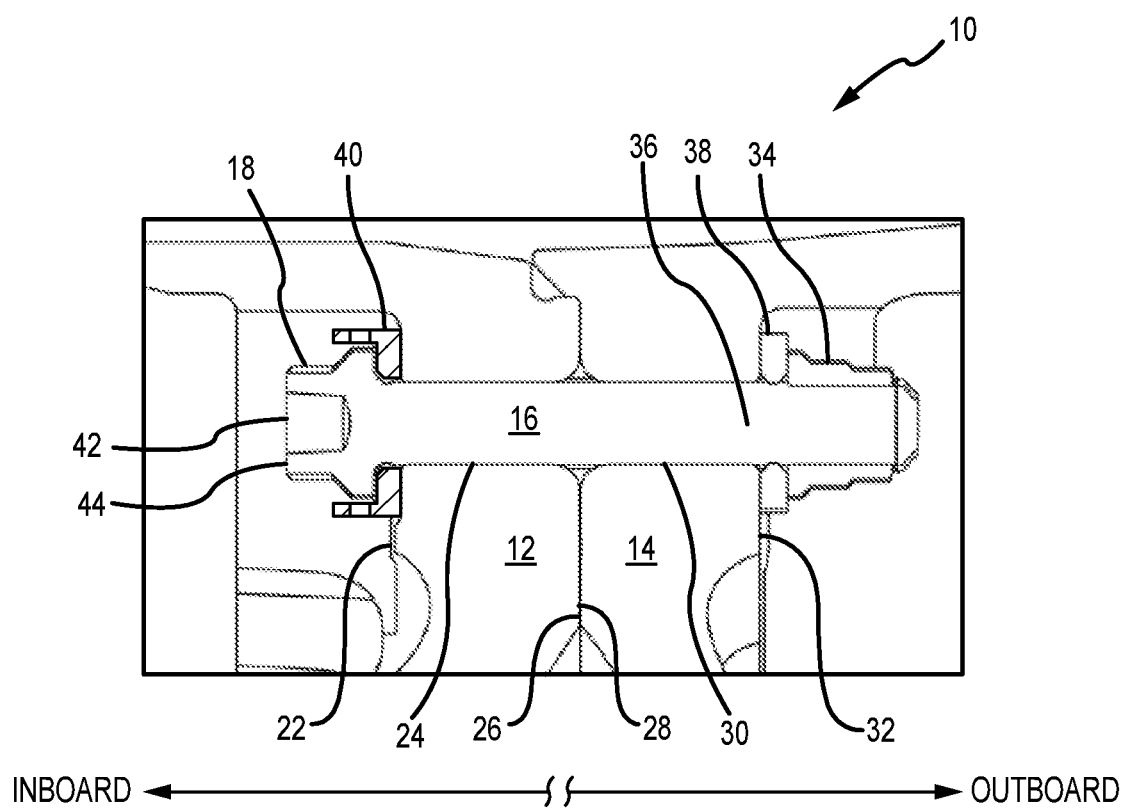
FIG. 3 is a cross-sectional view of a tie bolt arrangement of the wheel assembly of FIG. 1, in accordance with various embodiments.

Referring now also to FIG. 3, the tie bolts 16 of FIG. 1 extend outboard from the first wheel section 12 to and towards the second wheel section 14 of the wheel assembly 10 of FIG. 1. More specifically, the first wheel section 12 comprises a first inner surface 22, a first bolt hole 24, and a first outer surface 26, the first bolt hole 24 extending between the first inner surface 22 and the first outer surface 26. Likewise, the second wheel section 14 comprises a second inner surface 28, a second bolt hole 30, and a second outer surface 32, the second bolt hole 30 extending between the second inner surface 28 and the second outer surface 32.

In various embodiments, the first outer surface 26 of the first wheel section 12 and the second inner surface 28 of the second wheel section 14 abut one another, and the first bolt hole 24 substantially aligns with the second bolt hole 30 to receive the tie bolt 16 there through. In various embodiments, the tie bolt 16 is of sufficient length to extend between at least the first inner surface 22 of the first wheel section 12 and the second outer surface 32 of the second wheel section 14, including through the first bolt hole 24 and through the second bolt hole 30. In various embodiments, the tie bolt 16, in cooperation with a nut 34, helps secure the first wheel section 12 and the second wheel section 14 together, including through mating alignment of the first outer surface 26 of the first wheel section 12 and the second inner surface 28 of the second wheel section 14, as secured by the tie bolt 16 and the nut 34.

Referring still to FIG. 3, the tie bolt 16 comprises the tie bolt head 18 of FIG. 2, disposed proximal the first wheel section 12 and further inboard from the first inner surface 22 of the first wheel section 12, as well as a threaded end 36, disposed proximal the second wheel section 14 and protruding further outboard from the second outer surface 32 of the second wheel section 14. In various embodiments, an outboard washer 38, such as a flat washer, is intermediate the second outer surface 32 of the second wheel section 14 and the nut 34. In various embodiments, the nut 34 engages with the threaded end 36 of the tie bolt 16 in order to secure the tie bolt 16 within the first bolt hole 24 and the second bolt hole 30, as well as the first wheel section 12 and the second wheel section 14 together, including via mating the first outer surface 26 of the first wheel section 12 and the second inner surface 28 of the second wheel section 14. In various embodiments, a retention washer 40 is intermediate the tie bolt head 18 and the first inner surface 22 of the first wheel section 12. In various embodiments, the tie bolt head 18 includes a cavity 42 (or the like) extending outboard from an inboard surface 44 of the tie bolt head 18 towards the second wheel section 14 of the wheel assembly 10.

Referring generally, if the tie bolt 16 separates from the first wheel section 12 and/or the second wheel section 14 (e.g., separates from the first bolt hole 24 and/or the second bolt hole 30), including while operating the wheel assembly 10, and/or at any time when the tie bolt 16 is not expected to do so, it can contact, damage, impact, and/or impair the first wheel section 12, the second wheel section 14, the wheel assembly 10, and/or damage other components proximal and/or related thereto as well. Accordingly, the retention ring 20 of FIG. 2 contacts the tie bolt heads 18 of the tie bolts 16 to help retain the tie bolts 16 in place within the first wheel section 12 and/or the second wheel section 14 (e.g., within the first bolt hole 24 and/or the second bolt hole 30).

Figure 4:
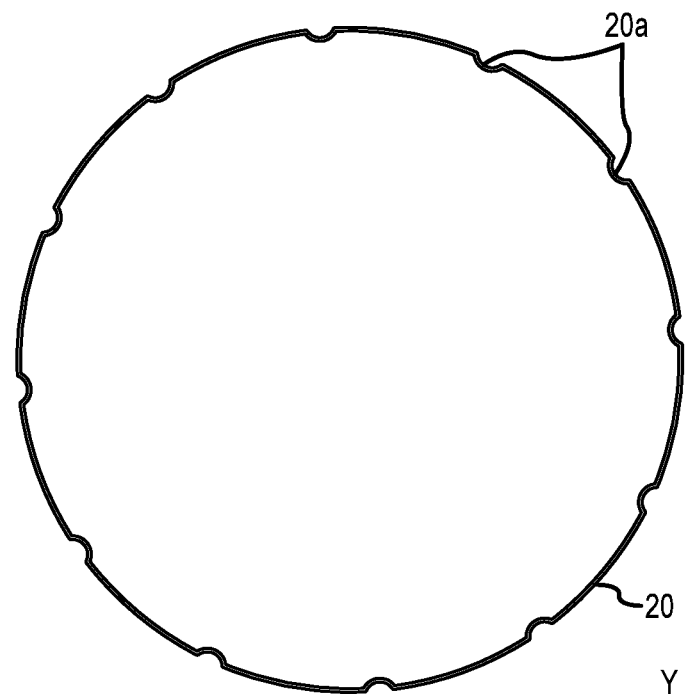
FIG. 4 is a planar view of a retention ring configured for use with the wheel assembly of FIG. 1, in accordance with various embodiments.
Figure 4:
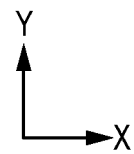

Referring now also to FIG. 4, the retention ring 20 (also referred to as a retention clip) is an annular structure made of, for example, metal, such as stainless steel, and it comprises, in various embodiments, a closed loop ring. In various embodiments, the retention ring 20 is radially sized to contact the tie bolt heads 18 of the tie bolts 16, and it forms a direct, physical barrier to retain the tie bolts 16 in position, should they start to become, and/or become, unintentionally separated from first wheel section 12 and/or the second wheel section 14. As such, the retention ring 20 retains the tie bolts 16 to the first wheel section 12. By retaining the tie bolts 16 to the first wheel section 12, even if a tie bolt 16 fails, the first wheel section 12 retains its mating alignment and/or contact with the second wheel section 14, the first wheel section 12 is prevented from separating from the second wheel section 14, and/or the tie bolt 16 is secure within the wheel assembly 10, in various embodiments.

In various embodiments, the tie bolt 16 can also attempt to separate from the first wheel section 12 of the wheel assembly 10 if, for example, the tie bolt 16 and/or nut 34 breaks and/or otherwise malfunctions, but it is prevented from traversing into the wheel assembly 10 by virtue of the retention ring 20. In various embodiments, the retention ring 20 is as flexible or as rigid as desired. In various embodiments, the retention ring 20 is made of metal, plastic, and/or other suitable combinations thereof, including in various composite combinations thereof as well.

Referring still to FIG. 4, the retention ring 20 is shaped with various indents 20a (and/or the like), such as located in an x-y plane in FIG. 4, in order to accommodate the physical geometries of the first wheel section 12 of the wheel assembly 10, in various embodiments. In various embodiments, the retention ring 20 is equally suitably placed face-up or face-down on the tie bolt heads 18 of the tie bolts 16 in order to secure the tie bolts 16 within the wheel assembly 10. In various embodiments, the retention ring 20 is rotatable to any position among the tie bolt heads 18 of the tie bolts 16, subject to positioning the indents 20a, if any, about the physical geometries of the first wheel section 12 of the wheel assembly 10.

Figure 5:
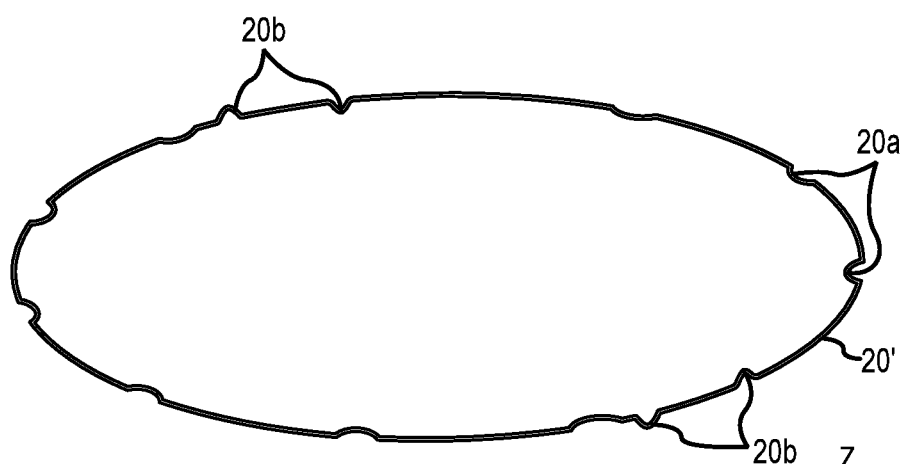
FIG. 5 is a perspective view of a retention ring configured for use with the wheel assembly of FIG. 1, in accordance with various embodiments.
Figure 5:
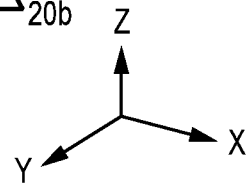

Referring now also to FIG. 5, the same and/or another retention ring 20' is formed and/or shaped with one or more protuberances 20b (and/or the like), such as located outside of an x-y plane in FIG. 5, in various embodiments. More specifically, the protuberances 20b extend in a z-direction in FIG. 5, particularly in order to engage the cavities 42 of the tie bolt heads 18 of the tie bolts 16, in various embodiments. In various embodiments, the protuberances 20b alternatively (and/or otherwise) extend in positive and/or negative z-directions, so that the retention ring 20' is again placed face-up or face-down on the tie bolt heads 18 of the tie bolts 16 in order to secure the tie bolts 16 within the wheel assembly 10, in various embodiments. In various embodiments, when one or more of the protuberances 20b of the retention ring 20' is received (e.g., snapped) within the cavity 42 of the tie bolt head 18 of the tie bolt 16, the retention ring 20' is hindered and/or prevented from rotating relative to the first wheel section 12 of the wheel assembly 10. In various embodiments, the retention ring 20' includes two pairs of protuberances 20b, the protuberances 20b within each pair spaced approximately 15° apart from one another in order to align with the tie bolts heads 18 of the tie bolts 16, and the pairs are spaced approximately 180° apart from one another along the retention ring 20'. In various embodiments, the retention ring 20' comprises more than two pairs of protuberances 20b. In various embodiments, the retention ring 20' comprises less than two pairs of protuberances 20b. In various embodiments, the retention ring 20' comprises four protuberances 20b. In various embodiments, the retention ring 20' comprises more than four protuberances 20b. In various embodiments, the retention ring 20' comprises less than four protuberances 20b.

Referring again also to FIGS. 1-2, the wheel assembly 10 includes as many as twenty-four tie bolts 16 disposed about the first wheel section 12 and the second wheel section 14, in various embodiments. In various embodiments, the wheel assembly 10 comprises more than twenty-four tie bolts 16 disposed about the first wheel section 12 and the second wheel section 14. In various embodiments, the wheel assembly 10 comprises less than twenty-four tie bolts 16 disposed about the first wheel section 12 and the second wheel section 14. In various embodiments, the tie bolts 16 are arranged equidistantly apart from one another in order to establish and/or maintain equalized weight distribution about the wheel assembly 10.

As described in reference to FIG. 3, the retention washer 40 is intermediate the tie bolt head 18 of the tie bolt 16 and the first inner surface 22 of the first wheel section 12, in various embodiments.

In various embodiments, at least one or more of the retention washers 40 (as described in additional detail herein) are configured to distribute force from the tie bolt heads 18 to larger surface areas than the tie bolt heads 18 and/or to secure tighter connections between the tie bolts 16 and the nuts 34, as well as to retain a retention spring 46 to help retain the retention ring 20 to the tie bolt heads 18 of the tie bolts 16.

Figure 6:
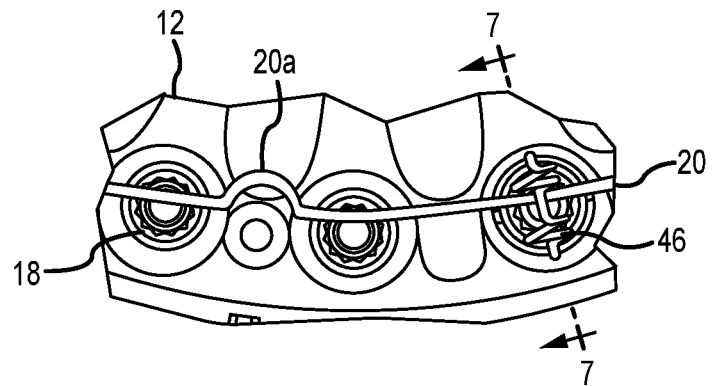
FIG. 6 is a partial, close-up, outboard-looking view of the inboard wheel section of FIGS. 1-2 including a retention ring, such as the retention ring of FIGS. 2 and 4-5, and a retention spring, in accordance with various embodiments.

More specifically, and referring now also to FIG. 6, the retention ring 20 is secured to the tie bolt heads 18 of the tie bolts 16 via the retention spring 46, in various embodiments.

Figure 7:
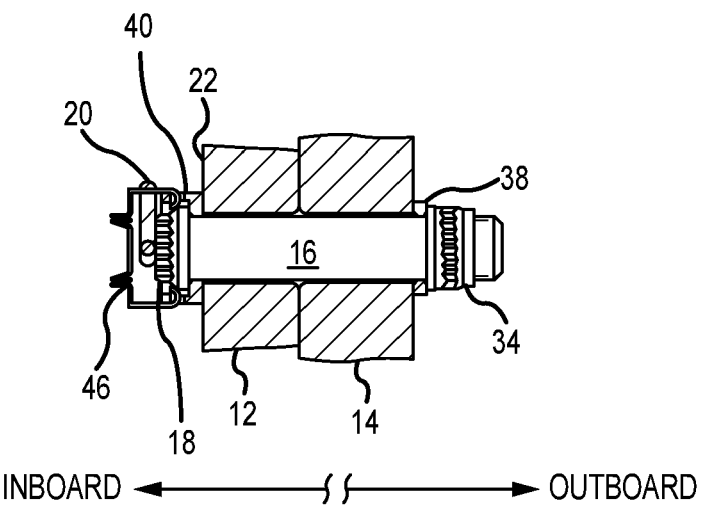
FIG. 7 is a cross-sectional view of a tie bolt, a retention spring, a retention ring, and a retention washer configured for use with the wheel assembly of FIG. 1, taken along line 7-7 of FIG. 6, in accordance with various embodiments.

Referring now also to FIG. 7, which is taken along line 7-7 of FIG. 6, the first wheel section 12 is secured to the second wheel section 14 by the tie bolt(s) 16 operating in conjunction with the nut(s) 34. In various embodiments, the outboard washer 38 is intermediate the second wheel section 14 and the nut 34. In various embodiments, the retention washer 40 is intermediate the tie bolt head 18 and the first wheel section 12. In various embodiments, the retention washer 40 is configured for mating alignment with the retention spring 46.

More specifically, the retention washer 40 is intermediate the tie bolt head 18 and the first inner surface 22 of the first wheel section 12 of the wheel assembly 10 of FIG. 1. In addition to distributing force from the tie bolt heads 18 to larger surface areas than the tie bolt heads 18 and/or to securing tighter connections between the tie bolts 16 and the nuts 34, the retention washer 40 also helps retain the retention ring 20 on the tie bolt heads 18, in conjunction with the retention spring 46, in various embodiments. The retention washers 40 and the retention springs 46 comprise retention assemblies, including for retaining the retention ring 20 on the first section 12 of the wheel assembly 10 and/or the tie bolts 16 within the first bolt hole 24 and/or the second bolt hole 30 shown in FIG. 3.

Referring now also to FIG. 2, three pairs of retention assemblies, including the retention washers 40 and the retention springs 46, are shown in conjunction with the tie bolt heads 18 of the tie bolts 16, with midpoints of each pairing being approximately 120° apart from one another about the first wheel section 12 of the wheel assembly 10, in various embodiments. If the wheel assembly 10 includes, for example, two pairs of retention assemblies about the first wheel section 12, then midpoints of each pairing are approximately 180° apart from one another, and if the wheel assembly 10 includes, for example, four pairs of retention assemblies about the first wheel section 12, then midpoints of each pairing are approximately 90° apart from one another, in various embodiments, so as to establish and/or maintain equalized weight distribution about the wheel assembly 10. In various embodiments, approximately, in this context, means plus or minus 5°, 10°, and/or 15°. Other configurations for the retention washers 40 and the retention springs 46 of the retention assemblies are also configurable for securing the retention ring 20 to the tie bolt heads 18 of the tie bolts 16.

Figures 8, 9:
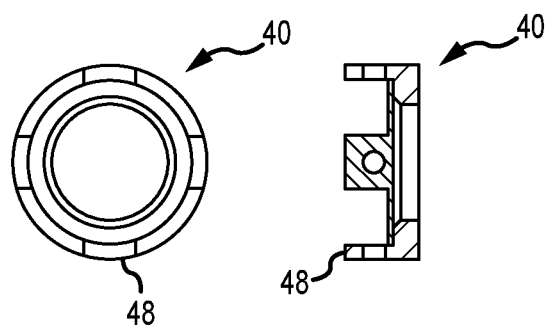
FIG. 8 is an outboard-looking view of the retention washer of FIGS. 2-3 and 7, in accordance with various embodiments.
FIG. 9 is a side view of the retention washer of FIGS. 2-3 and 7-8, in accordance with various embodiments.

Referring now also to FIGS. 7-9, the retention washers 40 include two or more extension arms 48 that extend inboard for receiving the retention spring 46, such as through an orifice in the extension arms 48, in various embodiments.

Figure 10:
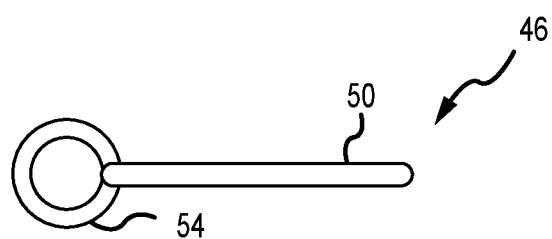
FIG. 10 is a top view of the retention spring of FIGS. 2 and 6-7, in accordance with various embodiments.
Figure 11:
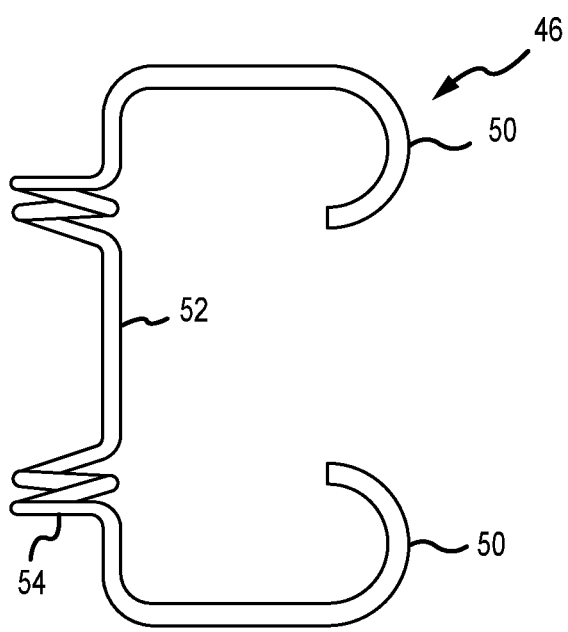
FIG. 11 is a side view of the retention spring of FIGS. 2, 6-7, and 10, in accordance with various embodiments.

Referring now also to FIGS. 7 and 10-11, the retention springs 46 include one or more (e.g., two) hooks 50 that extend outboard for reception by the extension arms 48 of the retention washers 40, in various embodiments. In various embodiments, the hooks 50 are configured for temporary flexibility that allow them to briefly flex open (i.e., push apart from one another) and then snap into place in conjunction with the extension arms 48 of the retention washers 40. In various embodiments, the hooks 50 are interconnected with a bridging piece 52 that interconnects the hooks 50. In various embodiments, the bridging piece 52 includes one or more looped coils 54. In various embodiments, the hooks 50 are integrated, monolithic, and/or of unitary construction with the bridging piece 52.

In various embodiments, and referring now also to FIG. 7, the retention ring 20 of FIGS. 2 and 4-7 is intermediate the retention spring 46 and the retention washer 40 when the retention spring 46 and the retention washer 40 are engaged together. More specifically, after the retention ring 20 is positioned about the tie bolt heads 18 of the tie bolts 16, the hooks 50 of the retention spring 46 are snapped into place about the extension arms 48 of the respective retention washers 40, so as to allow the retention ring 20 to prevent dislodging of the tie bolts 16 from the wheel assembly 10 if the tie bolt 16 and/or nut 34 (and/or other component) should fail and/or otherwise release the tie bolt 16 from the first bolt hole 24 and/or the second bolt hole 30 (see, e.g., FIG. 3) while the retention ring 20 is in place about the tie bolt heads 18 extending from the first wheel section 12. By preventing the tie bolts 16 from disengaging with the first wheel section 12 and/or the second wheel section 14 of the wheel assembly 10, the retention ring 20 maintains operating conditions for the wheel assembly 10, including without jeopardizing and/or minimizing separating the first wheel section 12 from the second wheel section 14 and/or causing other damaging conditions, in various embodiments.

Figure 12:
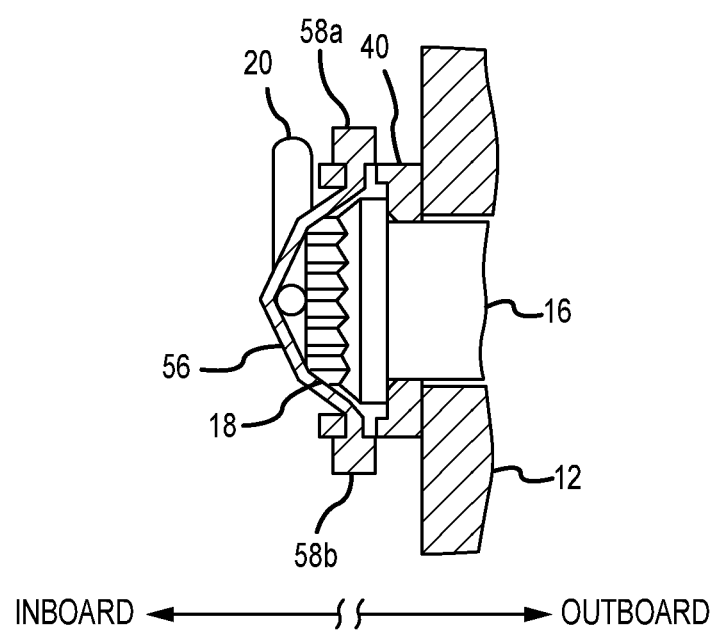
FIG. 12 is a partial cross-sectional side view of the retention ring of FIGS. 2 and 4-7, the retention washer of FIGS. 2-3 and 7-9, and a safety cable for retaining the retention ring to the tie bolts of the wheel assembly of FIG. 1, in accordance with various embodiments.

Referring now also to FIG. 12, an additional and/or alternative structure is provided for securing the retention ring 20 to the tie bolt heads 18 of the tie bolts 16, in various embodiments. More specifically, a safety cable 56 is used, in various embodiments, to interact with the extension arms 48 of the retention washer 40 (see FIGS. 7-9) in order to secure the tie bolts 16 to the first wheel section 12 of the wheel assembly 10 of FIG. 1, including without the retention spring 46. In various embodiments, the safety cable 56 is used to replace the retention spring 46.

Figure 13:
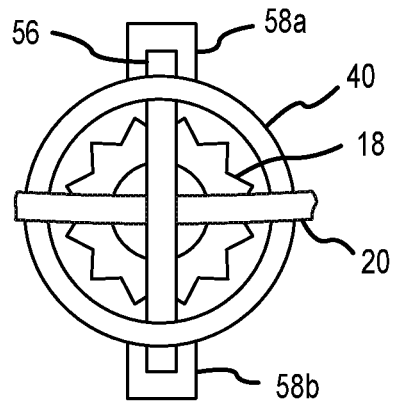
FIG. 13 is an outboard looking view of the safety cable of FIG. 12 affixed to the tie bolt head, in accordance with various embodiments.

Referring now also to FIGS. 12-13, the safety cable 56 is used, in various embodiments, to secure the tie bolts 16 to the first wheel section 12 of the wheel assembly 10 of FIG. 1, including without the retention spring 46. As used herein, the safety cable 56 implements, in various embodiments, a National Aerospace Standard referred to as NASM 33540. For example, in various embodiments, the safety cable 56 comprises a stainless steel wire having a thickness of 0.022-0.062 inches (0.559-1.575 mm), such as a 0.032 inch (0.813 mm) nominal diameter safety cable 56 having a maximum 0.075 inch (1.905 mm) opening within the retention washer 40, in accordance with the NASM 33540 standard. In various embodiments, a length of the safety cable 56 is determined by a staggered width across the tie bolt head 18 of the tie bolt 16, as well as a length of the safety cable 56 used to engage an application tool. In various embodiments, a first ferrule 58a is pre-attached to an end of the safety cable 56, in accordance with the NASM 33540 standard. Thereafter, the free end of the safety cable 56 is fed through opening in two opposing extension arms 48 of the retention washer 40 and pulled tight across the retention ring 20, securing the retention ring 20 to the tie bolt head 18 of the tie bolt 16. Thereafter, a second ferrule 58b is attached to the distal end of the safety cable 56. For example, in accordance with the NASM standard 33540, the safety cable 56 is installed with a calibrated application tool that applies a predetermined tension to the safety cable 56, crimps the second ferrule 58b onto the safety cable 56, and cuts any excess portion of the safety cable 56, without losing tension in the safety cable 56. In various embodiments, a minimum crimp requirement (i.e., pull-off load) of the ferrules 58 of the safety cable 56 is between 30-280 lbf, such as 70 lbf for the 0.032 inch (0.813 mm) nominal diameter safety cable 56. In various embodiments, standard and/or elongated ferrules 58 are used (e.g., the latter having a tapered surface proximal the retention washer 40). In various embodiments, the safety cable 56 is cut when accessing the tie bolt 16 after the initial installation, with new safety cables 56, and new ferrules 58, being used with each new application with each application of the safety cable 56. In various embodiments, the safety cable 56 is replaced with a new safety cable 56 in response to any damage to the safety cable 56 (e.g., a fray, kink, nick, and/or other mutilation). As described, the safety cable 56, in cooperation with the extension arms 48 of the retention washer 40, secures the retention ring 20 to the tie bolt heads 18 of the tie bolts 16.

In various embodiments, the safety cable 56 replaces the need for the retention spring 46.

In various embodiments, a retainer is configured to secure the retention ring 20 to the tie bolt heads 18 of the wheel assembly 10, the retainer comprising the retention spring 46 or the safety cable 56.

In accordance with at least the foregoing, the retention ring 20 (also referred to as a retention clip) engages at least a part, and/or all, of the tie bolt heads 18 of all (or many or most) of the tie bolts 16 of the wheel assembly 10 to reduce the tie bolts 16 from dislodging from the first wheel section 12 and/or the second wheel section 14 of the wheel assembly 10. In various embodiments, the wheel assembly 10 uses retention a spring force to keep the retention ring 20 in place. In various embodiments, the retention spring 46, in mating alignment with the retention washer 40, provides the retention spring force to keep the retention ring 20 in place. In various embodiments, the retention ring 20 includes an anti-rotation feature, such as the protuberance 20b that is configured for mating alignment with the cavity 42 of the tie bolt head 18 of the tie bolt 16. In various embodiments, the safety cable 56 is used to supplement and/or replace the retention spring 46 in order to secure the retention ring 20 to the first wheel section 12 and reduce the tie bolts 16 from dislodging from the first wheel section 12 and/or impacting the wheel assembly 10. In various embodiments, a plurality (e.g., six) of the retention washers 40 replace flat washers as between the tie bolt heads 18 of the tie bolts 16 and the first wheel section 12 of the wheel assembly 10. In various embodiments, the retention washers 40 are placed in pairs of twos, evenly spaced around the wheel assembly 10 in order to maintain wheel balance and/or missing tie bolt 16 requirements. In various embodiments, the retention springs 46 snap into place over the tie bolt heads 18 of the tie bolts 16 to engage with the retention washer 40 and keep the retention ring 20 in place about the first wheel section 12 of the wheel assembly 10. In various embodiments, the safety cable 56 is affixed over the tie bolt heads 18 of the tie bolts 16 to keep the retention ring 20 in place about the first wheel section 12 of the wheel assembly 10.

Figure 14:
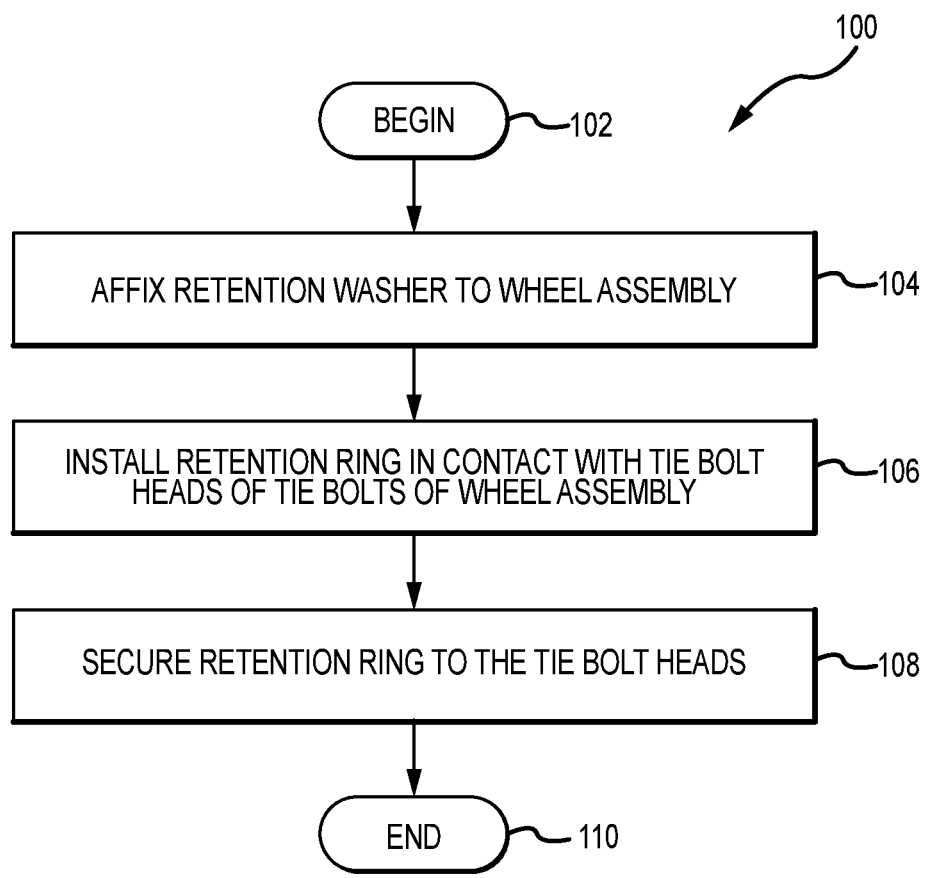
FIG. 14 illustrates a method of retaining a tie bolt to a wheel section of a wheel assembly, in accordance with various embodiments.

Referring now also to FIG. 14, a method 100 is provided for retaining the tie bolts 18 to the first wheel section 12 and the second wheel section 14 of the wheel assembly 10. More specifically, the method 100 begins at a step 102, after which the retention washer 40 is affixed to the wheel assembly 10 in a step 104. Thereafter, the retention ring 20 is installed in contact with the tie bolt heads 18 of the tie bolts 16 of the wheel assembly 10 in a step 106. Thereafter, the retention ring 20 is secured to the tie bolt heads 18 of the tie bolts 16, including by maintaining a spring force via the retention spring 46 or the safety cable 56 acting on the retention ring 20 in a step 108, after which the method 100 ends in a step 110. In various embodiments, the method 100 may be practiced with the elements described herein and/or with other elements. In various embodiments, the method 100 includes snapping the retention ring 20 into place over the tie bolt heads 18. In various embodiments, the method 100 includes reducing the retention ring 20 from rotating relative to the first wheel section 12 once installed in contact with the tie bolt heads 18 of the tie bolts 16 of the wheel assembly 10.

In various embodiments, various advantages of various embodiments can, but need not, include none or one or more of the following: minimal and/or no wheel or tie bolt 16 modifications when installing the retention ring 20 and/or retention washers 40; decreased service installation times; reduced and/or effortless impact to update legacy wheels; enabling enhanced visual inspections; decreased weight from a lock plate design for securing the tie bolts 16 to the first wheel section 12 and/or the second wheel section 14 of the wheel assemblies 10; and/or improving outcomes when the tie bolts 16 separate from the first wheel section 12 and/or the second wheel section 14 of the wheel assembly 10.

Advantages, benefits, improvements, and solutions, etc. have been described herein with regard to specific embodiments. Furthermore, connecting lines shown in the various figures contained herein are intended to represent exemplary functional relationships and/or direct/physical couplings between the various elements. It should be noted that many additional and/or alternative functional relationships or direct/physical connections may be present in a practical system. However, the advantages, benefits, improvements, solutions, etc., and any elements that may cause any advantage, benefit, improvement, solution, etc. to occur or become more pronounced are not to be construed as critical, essential, or required elements or features of this disclosure.

The scope of this disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one, and that reference to an item in the singular may also include the item in the plural, and vice-versa. All ranges and ratio limits disclosed herein may be combined.

Moreover, if a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C. Different cross-hatching may be used throughout the figures to denote different parts, but not necessarily to denote the same or different materials. Like depictions and numerals also generally represent like elements.

The steps recited in any of the method or process descriptions may be executed in any order and are not necessarily limited to the order presented. Furthermore, any reference to singular elements, embodiments, and/or steps includes plurals thereof, and any reference to more than one element, embodiment, and/or step may include a singular one thereof. Elements and steps in the figures are illustrated for simplicity and clarity and have not necessarily been rendered according to any particular sequence. For example, steps that may be performed concurrently or in different order are only illustrated in the figures to help to improve understanding of embodiments of the present, representative disclosure.

Any reference to attached, connected, fixed, or the like may include full, partial, permanent, removable, temporary and/or any other possible attachment option. Additionally, any reference to without contact (or similar phrases) may also include reduced contact or minimal contact. Surface shading lines may be used throughout the figures to denote different areas or parts, but not necessarily to denote the same or different materials. In some cases, reference coordinates may or may not be specific to each figure.

Apparatus, methods, and systems are provided herein. In the detailed description herein, references to "one embodiment," "an embodiment," "various embodiments," etc., indicate that the embodiment described may include a particular characteristic, feature, or structure, but every embodiment may not necessarily include this particular characteristic, feature, or structure. Moreover, such phrases may not necessarily refer to the same embodiment. Further, when a particular characteristic, feature, or structure is described in connection with an embodiment, it is submitted that it is within the knowledge of one skilled in the art to affect such characteristic, feature, or structure in connection with other embodiments, whether or not explicitly described. After reading the description, it will be apparent to one skilled in the relevant art(s) how to implement this disclosure in alternative embodiments.

Furthermore, no component, element, or method step in the present disclosure is intended to be dedicated to the public regardless of whether the component, element, or method step is explicitly recited in the claims. No claim element is intended to invoke 35 U.S.C. § 112(f) unless the element is expressly recited using the phrase "means for." As used herein, the terms "comprises," "comprising," or any other variation thereof, are intended to cover a non-exclusive inclusion, such that an apparatus, article, method, or process that comprises a list of elements does not include only those elements, but it may also include other elements not expressly listed or inherent to such apparatus, article, method, or process.

What is claimed is:

1. A tie bolt retention assembly, comprising:
   a retention ring configured to contact a tie bolt head of a tie bolt;
   a retention washer configured to be disposed between the tie bolt head and a wheel section of a wheel assembly; and
   a retainer configured to engage with the retention washer;
   wherein the retention washer and the retainer are configured to secure the retention ring to the tie bolt head,
   wherein the retainer comprises a retention spring, and
   wherein the retention spring is configured to snap into place over the tie bolt head when aligned with the retention washer.

2. The tie bolt retention assembly of claim 1, wherein an extension arm of the retention washer is configured to engage a hook of the retention spring.

3. The tie bolt retention assembly of claim 1, wherein a bridging piece of the retention spring includes a coil.

4. The tie bolt retention assembly of claim 1, wherein the retention ring includes an anti-rotation protuberance.

5. The tie bolt retention assembly of claim 4, wherein the anti-rotation protuberance is configured to engage a cavity within the tie bolt head.

6. The tie bolt retention assembly of claim 1, wherein the retainer comprises a safety cable.

7. The tie bolt retention assembly of claim 6, wherein an extension arm of the retention washer is configured to engage the safety cable.

8. The tie bolt retention assembly of claim 1, wherein the tie bolt retention assembly is configured for use with an aircraft wheel assembly.

9. A wheel assembly, comprising:
    a tie bolt securing a first wheel section to a second wheel section, the tie bolt having a tie bolt head proximal the first wheel section;
    a retention ring configured to contact the tie bolt head;
    a retention washer configured to be disposed between the tie bolt head and the first wheel section; and
    a retainer configured to engage with the retention washer;
    wherein the retention washer and the retainer are configured to secure the retention ring to the tie bolt head,
    wherein the retention ring includes an anti-rotation protuberance, and
    wherein the tie bolt head includes a cavity and the anti-rotation protuberance is configured to engage the cavity.

10. The wheel assembly of claim 9, wherein the retainer comprises a retention spring.

11. The wheel assembly of claim 9, wherein the retainer comprises a safety cable.

12. The wheel assembly of claim 9, wherein the wheel assembly is configured for use with an aircraft wheel assembly.

13. A method of securing a retention ring to a wheel assembly, comprising:
    affixing a retention washer to the wheel assembly;
    installing the retention ring in contact with a tie bolt head of a tie bolt of the wheel assembly;
    applying a spring force to the retention washer or attaching a safety cable to the retention washer to secure the retention ring to the tie bolt head;
    reducing the retention ring from rotating relative to a wheel section of the wheel assembly; and
    engaging an anti-rotation protuberance of the retention ring with a cavity within the tie bolt head.

14. The method of securing the retention ring of claim 13, wherein the wheel assembly is configured for use with an aircraft wheel assembly.

15. A tie bolt retention assembly, comprising:
    a retention ring configured to contact a tie bolt head of a tie bolt;
    a retention washer configured to be disposed between the tie bolt head and a wheel section of a wheel assembly; and
    a retainer configured to removably engage with the retention washer;
    wherein the retention washer and the retainer are configured to secure the retention ring to the tie bolt head,
    wherein the retention ring includes an anti-rotation protuberance, and
    wherein the anti-rotation protuberance is configured to engage a cavity within the tie bolt head.

* * * * *